United States Patent [19]
Banthin et al.

[11] Patent Number: 5,239,830
[45] Date of Patent: Aug. 31, 1993

[54] PLURAL ENGINE POWER PRODUCING SYSTEM

[75] Inventors: Clifford Banthin, Redding; Jochen Deman, Newtown, both of Conn.

[73] Assignee: AVCO Corporation, Providence, R.I.

[21] Appl. No.: 846,150

[22] Filed: Mar. 5, 1992

[51] Int. Cl.$^5$ ............................................. F02B 73/00
[52] U.S. Cl. ........................................ 60/718; 60/716
[58] Field of Search ................. 60/39.142, 39.2, 39.15, 60/716, 717, 718

[56] References Cited

U.S. PATENT DOCUMENTS

| | | |
|---|---|---|
| 1,127,484 | 2/1915 | Metten . |
| 1,296,378 | 3/1919 | Fottinger . |
| 2,040,643 | 5/1936 | Cook et al. . |
| 2,303,381 | 12/1942 | New . |
| 2,723,531 | 11/1955 | Wosika et al. . |
| 2,838,913 | 6/1958 | Peterson et al. . |
| 3,163,983 | 1/1965 | Donohue . |
| 3,165,897 | 1/1965 | Coats et al. . |
| 3,358,441 | 12/1967 | Gist, Jr. . |
| 3,416,309 | 12/1968 | Elmes et al. . |
| 3,487,721 | 1/1970 | Burkhardt et al. . |
| 3,635,019 | 1/1972 | Kronogard et al. ............... 60/39.15 |
| 3,662,544 | 5/1972 | Kahn et al. . |
| 3,868,818 | 3/1975 | Itoh ................................... 60/39.15 |
| 3,930,366 | 1/1976 | Nelson . |
| 3,963,372 | 6/1976 | McLain et al. . |
| 3,969,890 | 7/1976 | Nelson . |
| 4,137,721 | 2/1979 | Glennon et al. . |
| 4,147,024 | 4/1979 | Moellmann . |
| 4,149,374 | 4/1979 | Barchenko . |
| 4,159,623 | 7/1979 | McReynolds . |
| 4,344,760 | 8/1982 | Kulikowski . |
| 4,369,630 | 1/1983 | Bloomfield . |
| 4,522,025 | 6/1985 | Greune et al. . |
| 4,864,812 | 9/1989 | Rodgers et al. ..................... 60/39.15 |

*Primary Examiner*—Stephen F. Husar
*Attorney, Agent, or Firm*—Perman & Green

[57] ABSTRACT

Two gas turbine engines are interconnected through a pneumatic, mechanical, hydraulic, or power link. This power link runs from the gas producer shaft of one engine to the gas producer shaft of the other engine either delivering or absorbing power directly to or from each other. The gas producer section of a gas turbine engine comprises a compressor directly coupled to a turbine which drives the compressor and a combustor positioned between the compressor and the turbine. The unit delivers hot gases to another turbine on a separate independent shaft which is the output power shaft for the engine. Through the use of clutches, swash plates or valves, selectable operating modes are achieved. Such a two engine system has been found to exhibit superior performance over a single engine system which includes maximum power boost and better full consumption at low powers.

14 Claims, 2 Drawing Sheets

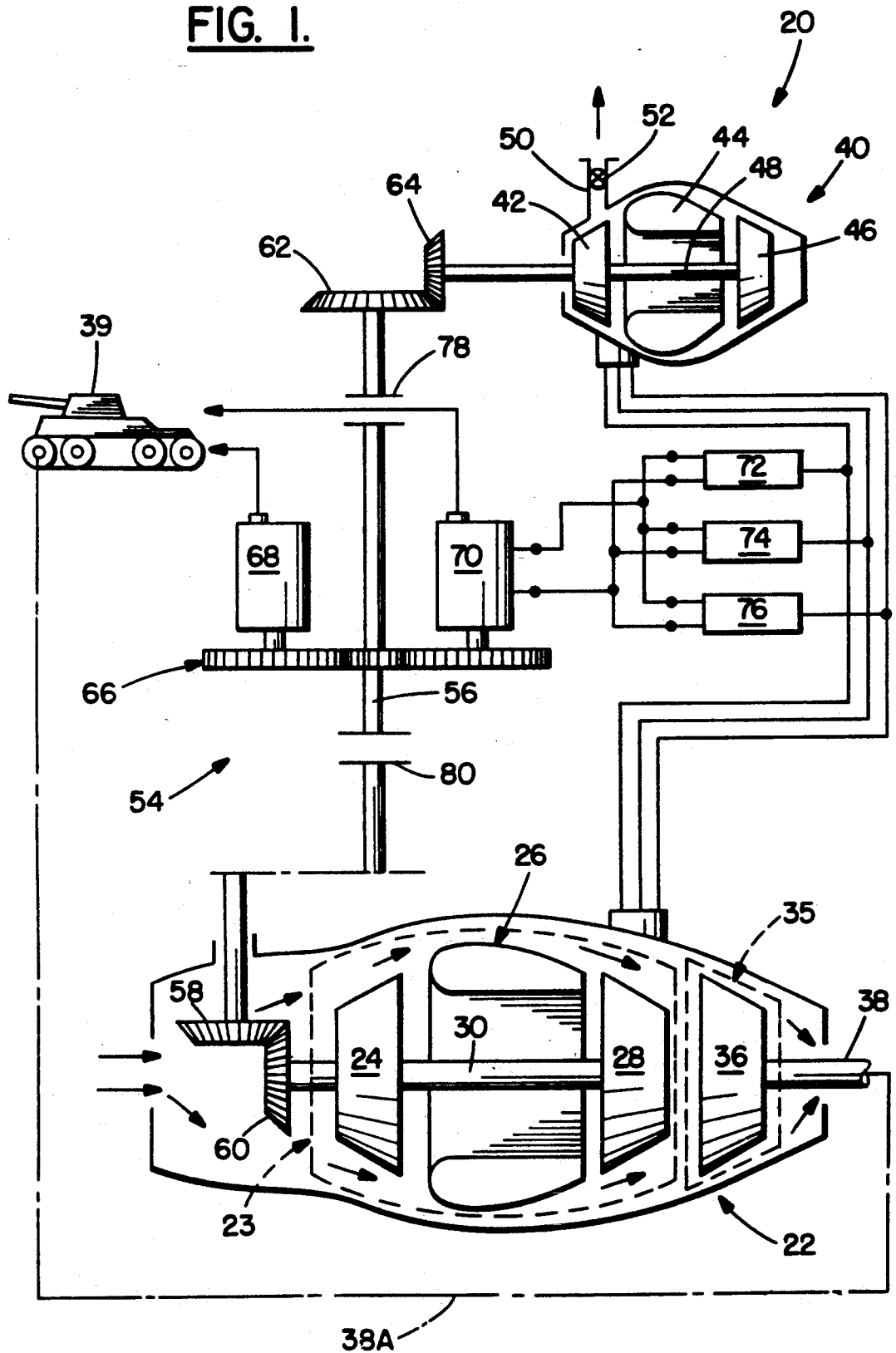

|  | ENGINE STATUS | | COUPLING STATUS | |
|---|---|---|---|---|
| FUNCTION | ENG. 22 | ENG. 40 | COUPL. 78 | COUPL. 80 |
| (1) Engine 22 Running (Power, Aux. Power) | X | O | O | X |
| (2) Engine 40 Running (Bleed, Aux. Power) | O | X | X | O |
| (3) Eng. 22 and eng. 40 Running | X | X | X | O |
| (4) Eng. 22 Drives Eng. 40 | X | O | X | X |
| (5) Eng. 40 Drives Eng. 22 | X | X | X | X |
| (6) Eng. 40 Starts Eng. 22 | ∅ | X | X | X△ |
| (7) Eng. 22 Starts Eng. 40 | X | ∅ | X△ | X |
| (8) Aux. Power Starts Eng. 22 | ∅ | O | O | X△ |
| (9) Aux. Power Starts Eng. 40 | O | ∅ | X△ | O |

Legend: X - Fired
O - Unfired
∅ - Start

Coupling X - Coupled
O - Uncoupled
X△ - Slipping

FIG. 2

PLURAL ENGINE POWER PRODUCING SYSTEM

BACKGROUND OF THE INVENTION

1. Field of the Invention

The present invention relates to a system for directly and selectively interconnecting, either mechanically, hydraulically, or pneumatically, two gas turbine engines for purposes of achieving both improved performance and economy of operation.

2. Description of the Prior Art

The relative simplicity, compactness, and light weight of the gas turbine engine cause it to be a preferred power plant for a variety of vehicles whether aircraft, watercraft, or landcraft. At the same time, gas turbines as previously used have been inherently inefficient when operated at less than their maximum power, and for many applications must so operate much of the time. Unfortunately, the thermal efficiency of gas turbines falls off very rapidly as the load is reduced, much more rapidly than in the case of conventional reciprocating internal combustion engines, and thus the specific fuel consumption rises proportionately. Indeed, in some instances, the high specific fuel consumption of the gas turbine engine under average operating conditions has outweighed the advantages of simplicity, compactness, and light weight, because the weight and volume of the extra fuel that had to be carried.

Various expedients have been attempted to raise the part power efficiency of gas turbines by changes in gas turbine engine designs including variable pitch blades in the compressor and turbine sections and by adding recuperators. However, such expedients have only partially improved the part power specific fuel consumption. One approach to solving the problem has been disclosed in U.S. Pat. No. 2,723,531 to Wosika et al. In that instance, efficiency was said to be greatly improved by employing in a power plant a plurality of small turbine units all adapted to be coupled to a single generator, and working only as many units as necessary to satisfy the power demand at anytime. For example, if two turbine units are employed, the specific fuel consumption can be reduced by almost one half, where the power plant must operate over a wide load range.

An early patent which relates to the use of multiple gas turbine engines of the turboprop type and to clutching arrangements between the engines and their associated propellers is disclosed in U.S. Pat. No. 2,838,913 to Peterson et al.

According to the invention disclosed in U.S. Pat. No. 3,416,309 to Elmes et al., an engine installation has at least two engines each of which is connected to drive at least one accessory mounted upon a respective gearbox through an output shaft. Power management control systems for multiple engine installations utilizing gas turbine engines are variously disclosed in U.S. Pat. Nos. 3,930,366 and 3,969,890 to Nelson, 3,963,372 to McLain et al. and to 4,137,721 to Glennon et al.

None of these patented systems, however, discloses an interconnection between the gas producers of the respective engines. It was in light of the state of the art as just mentioned that the present invention has been conceived and is now reduced to practice.

SUMMARY OF THE INVENTION

According to the present invention, two gas turbine engines are interconnected through a pneumatic, mechanical, hydraulic, or power link. This power link runs from the gas producer shaft of one engine to the gas producer shaft of the other engine either delivering or absorbing power directly to or from each other. The gas producer section of a gas turbine engine comprises a compressor directly coupled to a turbine which drives the compressor and a combustor positioned between the compressor and the turbine. The unit delivers hot gases to another turbine on a separate independent shaft which is the output power shaft for the engine. Through the use of clutches, swash plates or valves, selectable operating modes are achieved. Such a two engine system has been found to exhibit superior performance over a single engine system which includes maximum power boost and better fuel consumption at low powers.

The interconnecting power train is designed to allow the following operating modes:

(a) a primary engine and a significantly smaller secondary engine run independently of each other; either the primary engine or the secondary engine can drive auxiliary power units and deliver bleed air from a load compressor or its own compressor;

(b) the primary engine drives into the secondary engine or the secondary engine drives into the primary engine while simultaneously driving the auxiliary power units; and (c) both engines can share the same engine required accessories including fuel pump, oil pump, and controls.

The arrangement of the invention yields the following operational benefits over a single gas turbine engine system:

(a) the secondary engine, being smaller, that is, having a lower power rating, can deliver auxiliary power and bleed air at a reduced fuel consumption than the larger primary engine which for the same purpose would have to operate at a low part power.

(b) the secondary engine can assist the compressor shaft of the primary engine and thereby provide power augmentation of the primary engine, the primary engine's boosted output power being greater than the input power of the secondary engine.

(c) the primary engine can drive the secondary engine, which is unfired, to provide bleed air from the compressor of the secondary engine; this occurs when the primary engine is required to operate for other reasons, for example, for propelling a vehicle.

(d) the secondary engine can start the primary engine (or visa versa) directly; in cold conditions, the secondary engine can be started initially, thereby reducing the size or number of batteries required.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

BRIEF DESCRIPTION OF THE DRAWINGS

FIG. 1 is a diagrammatic view of a system embodying the invention for producing power utilizing gas turbine engines; and FIG. 2 is a presentation of the functions and drive modes of two gas turbine engines whose gas generators are coupled through a suitable on/off mechanism, all according to the invention.

DETAILED DESCRIPTION OF THE PREFERRED EMBODIMENTS

Turn now to the drawings, and initially, to FIG. 1 which diagrammatically depicts a system 20 for producing power in accordance with the teachings of the present invention. The system 20 may be used for powering any one of a variety of vehicles including ships, aircraft, and land vehicles. In any event, a primary gas turbine engine 22 having a moderate power rating is seen to include a gas generator 23, which comprises a compressor 24, a combustor 26, and a turbine 28 which, by means of a primary drive shaft 30, is drivingly engaged with the compressor 24.

An output power section 35 including a power turbine 36 is provided at the aft end of the engine 22 but is independent of the turbine 28 and the other components comprising the gas generator. By way of an output shaft 38, the power turbine 36 can drive an external load. For example, if the system 20 is the power plant for a ship, the output shaft 38 would serve to drive the screws used to propel it through the water. In the event the vehicle being powered were an aircraft, the shaft 38 would be connected to a propeller or to a fan. In the event the system 20 were used in conjunction with a land vehicle, for example, a tank 39, the shaft 38 would be connected, through a transmission represented by a line 38A to the tracks of the tank.

The system 20 also includes a secondary gas turbine engine 40 which includes a compressor 42, a combustor 44, and a turbine 46 which is drivingly engaged with the compressor by way of a drive shaft 48. Indeed, the compressor 42 and the turbine 46 are fixed to the drive shaft 48 for unitary rotation therewith. The engine 40 is provided with bleed duct 50 having a bleed valve 52 therein for selectively drawing off pressurized air from the compressor 42. When the system 20 is used to power a land vehicle, and more specifically, the tank 39, a primary use for the bleed air is to supply the interior of the tank with "NBC" conditioned air, that is, air which is carefully filtered to remove any nuclear, biological, or chemical agents which would adversely affect the crew of the tank. For purposes of the invention, the valve 52 is operated by a vehicle crew member whenever NBC air is required.

The system 20 further includes an intermediate drive mechanism 54 for selectively, mechanically (in this example), coupling the gas generator of the engine 22 with the gas generator, or secondary, engine 40. To this end, an intermediate shaft 56 includes, at one end, an integral bevel gear 58 drivingly engaged with a bevel gear 60 fixed for rotation on the drive shaft 30. In like manner, at the opposite end of the intermediate shaft 56 is a bevel gear 62 fixed for rotation thereon drivingly engaged with a bevel gear 64 on the end of the gas producer shaft 48 of the secondary engine 40.

A suitable transmission 66, diagrammatically illustrated in FIG. 1 mechanically interconnects the intermediate shaft 56 with auxiliary power units 68 also diagrammatically depicted and representing those components which are external of the system 20 but necessary for the operation of the vehicle 39 being powered. Such devices might include hydraulic pumps and generators. The transmission 66 is also provided to couple system accessories 70 to the intermediate shaft 56. The accessories 70 are components which are necessary for the operation of the system 20 and include, for example, a fuel pump 72, an oil pump 74, and electrical or electronic controls 76.

The intermediate drive mechanism 54 includes a pair of clutches 78, 80 for selectively coupling the primary and secondary drive shafts 30, 48. That is, when both of the clutches 78, 80 are engaged, the drive shafts 30, 48 are drivingly coupled. Furthermore, the clutches 78, 80 are so positioned that the auxiliary power units 68 and the accessories 70 can be selectively powered by either the engine 22, or by the engine 40, or by both of them simultaneously.

The system 20 provides three primary benefits. In one instance, an outstanding feature resides in starting the larger, primary engine 22. Specifically, because the engine 40 is of a much smaller power rating, it can readily be started by means of a battery while battery starting of the engine 22 is much more difficult and requires much larger sized batteries which are heavy and cumbersome. Once the secondary engine 40 has been started, with clutch 78 engaged to simultaneously operate system accessories 72, 74, and 76, while the primary engine remains unfired, the clutch 80 can be engaged to thereby drivingly couple the shafts 30, 48. With the engine 40 thereby drivingly engaged with the gas generator of the primary engine 22, a mass flow rate of air through the primary engine is developed which is sufficient, once the combustors 26 are fired, to initiate operation of the engine 22. Thereafter, once self-sustained operation has been achieved, the clutches 78, 80 can remain engaged or be disengaged, as desired. In this regard, self sustaining operation is said to be achieved when starting a gas turbine engine as a result of the following sequence of events. The compresser and turbine are driven up to some defined part speed, at which the air flow through these units is sufficient enough to ignite and maintain a flame in the combustor and the power output of the turbine is great enough to drive and maintain the compressor at a fixed speed.

Consider a second benefit of the invention. In instances of operation of the vehicle 39 during which the output of the engine 22 is not required but the auxiliary power units 68 and accessories 70 are required, the clutch 80 can be disengaged while the clutch 78 is engaged. In this manner, the engine 40, with its substantially lower fuel consumption, becomes the operating power plant for the vehicle 39.

As a third benefit provided by the system 20, the engine 40 can be utilized to provide a significant boost for the output of the engine 22. It will be appreciated that, operating by itself, the power output to the shaft 38 of the engine 22 is limited by reason of the maximum operating limits including inlet temperature and speed permitted for the turbine 28. Exceeding these limits may result in a dangerous condition and shorten the life of the gas turbine engine. By introducing more air into and through the engine 22, that is, by increasing the mass flow rate by coupling the drive shaft 48 of engine 40 to the drive shaft 30 of engine 22, the air flow created by the compressor 24 can be significantly increased. In this manner, an increase in the rate of fuel delivery to the combustors 26 can also be accommodated without increasing temperature to the turbine 28 but increases power output by virtue of the greater mass flow passing through the engine. Since the power input to engine 22 works directly on its gas generator section 23, greater output power from the power turbine 36 and its output shaft 38 is achieved than the power input to engine 22 from engine 40.

Thus, by reason of the system 20, a small secondary engine 40 can be used to start a much larger primary engine 22; the secondary engine 40 can be utilized during idle periods to thereby offset the much greater fuel consumption of the primary engine 22; and by operating the engines 22, 40 in the manner just described, boost power during critical periods can be achieved readily without harming the engine 22 or requiring any substantial modification to its design.

All of the different modes of operation of the system 20 are depicted in FIG. 2.

The performance enhancement provided by the system 20 can be even better understood from the following examples:

EXAMPLE 1

Power Boost Enhancement While Providing NBC:

Engine 22 alone supplies 1450 sHP at an allowable 50° F. turbine inlet temperature increase while also supplying NBC air. With both engines 22 and 40 operating, and engine 40 being rated at 100 HP, engine 22 supplies power for vehicle propulsion only while engine 40 supplies all "non propulsion" power to auxiliary power units 68, NBC air from compressor 42 through valve 52, and approximately 50 HP into engine 22 through shaft 56 and clutch 80. This both eliminates the burden on engine 22 and boosts its vehicle propulsion power as follows:
 (a) engine 22 alone: total propulsion horsepower=1450
 (b) engine 22 plus engine 40: total propulsion horsepower=1660

Result: A 210 HP gain is achieved at the output shaft 38 from the 100 HP secondary engine 40.

EXAMPLE 2

Power Boost Enhancement Without Providing NBC:

With engines 22 and 40 operating as in Example 1 except that, in this instance, the burden of supplying NBC air is not required and engine 22 no longer is allowed to use the 50° F. turbine inlet temperature increase.
 (a) engine 22 alone: total propulsion horsepower=1480
 (b) engine 22 plus engine 40: total propulsion horsepower=1620

Result: A 140 HP gain is achieved at the output shaft 38 from the 100 HP of the secondary engine 40.

NOTE: In EXAMPLE 1, the elimination from engine 22 of the severe penalty to maximum power caused by NBC air bleed allows a much greater benefit in maximum power gain than occurs in the "no NBC air" situation of EXAMPLE 2.

EXAMPLE 3

Fuel Savings Enhancement At Idle:

With engine 22 turned off and vehicle 53 not moving, engine 40 supplies all non-propulsion power to auxiliary units 68 through clutch 78; assuming NBC air is not required, the much smaller secondary engine 40 now operates at part power to supply, for example, a 5 KW electric load in lieu of large engine 22 to accomplish the same task:
 (a) Engine 22: fuel consumption=60 lbs./hr.
 (b) engine 40: fuel consumption=30 lbs./hr.

Result: At idle, fuel consumption is reduced by 50% a period(.)

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A system for producing power utilizing gas turbine engines comprising:
 a primary engine including a gas generator and a power turbine;
 a secondary engine including:
 a compressor;
 a combustor; and
 a turbine drivingly engaged with said compressor;
 drive means selectively coupling said gas generator of said primary engine and said secondary engine for augmenting the output power of the primary engine and for achieving improved fuel consumption of said system at low power levels.

2. A system for producing power as set forth in claim 1 wherein said secondary engine has a lower power rating than said primary engine.

3. A system for producing power as set forth in claim 1 wherein said drive means includes:
 a primary drive shaft operatively associated with said gas generator;
 a secondary drive shaft on which said compressor and said turbine are mounted for rotation; and
 coupling means selectively coupling said primary and said secondary drive shafts.

4. A system for producing power as set forth in claim 1 wherein said gas generator includes:
 a primary compressor;
 a primary combustor; and
 a primary turbine drivingly engaged with said primary compressor; and
 wherein said primary engine includes:
 a power turbine distinct from said primary turbine for selectively driving an external load.

5. A system for producing power as set forth in claim 3 wherein said turbine of said secondary engine is capable of producing an amount of power in excess of that required to drive said compressor thereof; and
 wherein said system includes bleed valve means for selectively withdrawing from said compressor a quantity of compressed air which is no greater than that required for self-sustaining operation of said secondary engine.

6. A system for producing power as set forth in claim 3 including:
 an auxiliary power unit operable for generating electricity for operating components external of said system; and
 wherein said clutch means includes:
 first clutch means for selectively coupling said auxiliary power unit to said primary drive shaft; and second clutch means for selectively coupling said auxiliary power unit to said secondary drive shaft.

7. A system for producing power as set forth in claim 3 including:
accessory components necessary for the operation of said primary engine and said secondary engine; and wherein said clutch means includes:
first clutch means for selectively coupling said accessory components to said primary drive shaft; and
second clutch means for selectively coupling said accessory components to said secondary drive shaft.

8. A method of operating a power producing system utilizing a primary gas turbine engine including a gas generator having an operatively associated primary drive shaft and a secondary gas turbine engine including a compressor, a combustor, a turbine, and a secondary drive shaft drivingly interconnecting the turbine and compressor comprising the step of:
selectively mechanically coupling the primary drive shaft and the secondary drive shaft whereby the secondary gas turbine engine augments the power output of the primary gas turbine while minimizing fuel consumption.

9. A method of operating a power plant system including a primary gas turbine engine and a secondary gas turbine engine so as to achieve optimum power augmentation and also minimal fuel consumption at low power levels comprising the steps of:
while operating the primary engine, selectively coupling the compressor of the secondary engine to the gas generator of the primary engine, the secondary engine being substantially smaller than the primary engine, the gas generator of the primary engine including a primary compressor, a primary combustor, and a primary turbine drivingly engaged with the primary compressor;
operating the secondary engine to supplement the primary engine by driving the primary engine gas generator and thereby increasing the mass flow of air through the primary engine.

10. A method of operating a power plant system as set forth in claim 9 including the steps of:
providing an auxiliary power unit operable for generating electricity for operating components external of said system; and
providing accessory components for operating said primary engine and said secondary engine;
providing a primary drive shaft operatively associated with said gas generator;
providing a secondary drive shaft on which said compressor and said turbine are mounted for rotation; and
selectively coupling either or both of said primary drive shaft and/or said secondary drive shaft to either or both of said auxiliary power unit and/or said accessory components for operation thereof.

11. A method of operating a power plant system including a primary gas turbine engine and a secondary gas turbine engine comprising the steps of:
with the primary engine initially unfired, coupling the compressor of the secondary engine to the gas generator of the primary engine, the gas generator of the primary engine including a primary compressor, a primary combustor, and a primary turbine drivingly engaged with the primary compressor;
with the compressor of the secondary engine drivingly engaged with the gas generator of the primary engine, developing a mass flow rate of air through the primary engine which is sufficient to support operation thereof; and
firing the primary combustor to thereby initiate and maintain self-sustaining operation of the primary engine.

12. A method of operating a power plant system as set forth in claim 11 including the step of:
continuing to operate the secondary engine to thereby supplement the primary gas generator to increase power output of the primary engine.

13. A method of operating a power plant system as set forth in claim 11 wherein the secondary engine has a lower power rating than the primary engine.

14. A method of operating a power plant system including a primary gas turbine engine and a secondary gas turbine engine including a compressor and a turbine rotatably mounted on a secondary drive shaft and having a substantially lower power rating than the primary engine so as to achieve optimum power augmentation and also minimal fuel consumption at low power levels comprising the steps of:
providing an auxiliary power unit operable for generating electricity for operating components external of the power plant system; and providing accessory components for generating the primary engine and the secondary engine;
with the primary engine unfired, simultaneously coupling the secondary drive shaft to both said auxiliary power unit and said accessory components for operation thereof.

* * * * *